United States Patent
Lastinger

[11] Patent Number: 6,104,311
[45] Date of Patent: *Aug. 15, 2000

[54] INFORMATION STORAGE AND IDENTIFICATION TAG

[75] Inventor: Roc A. Lastinger, Charelston, S.C.

[73] Assignee: Addison Technologies, Mesa, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,950

[22] Filed: Aug. 26, 1996

[51] Int. Cl.⁷ ....................................................... H04Q 1/00
[52] U.S. Cl. .................................. 340/825.54; 340/572.1
[58] Field of Search ......................... 340/825.54, 825.34, 340/825.31, 572, 825.69, 825.72, 572.1, 572.3, 572.5

[56] References Cited

U.S. PATENT DOCUMENTS

| | | |
|---|---|---|
| 3,810,147 | 5/1974 | Lichtblau ................................. 340/572 |
| 4,129,855 | 12/1978 | Rodrain ................................. 340/825.54 |
| 4,333,072 | 6/1982 | Beigel ................................... 340/825.54 |
| 4,682,154 | 7/1987 | Fearon et al. . |
| 4,811,000 | 3/1989 | Humphrey et al. . |
| 4,910,449 | 3/1990 | Benge et al. ............................. 340/572 |
| 4,968,972 | 11/1990 | Canipe . |
| 5,059,951 | 10/1991 | Kaltner . |
| 5,061,941 | 10/1991 | Lizzie et al. . |
| 5,081,445 | 1/1992 | Gill et al. . |
| 5,081,446 | 1/1992 | Gill et al. . |
| 5,103,209 | 4/1992 | Lizzi et al. . |
| 5,103,210 | 4/1992 | Rode et al. . |
| 5,103,235 | 4/1992 | Clemens . |
| 5,119,070 | 6/1992 | Matsumote et al. ..................... 340/572 |
| 5,142,270 | 8/1992 | Appalucci et al. . |
| 5,142,292 | 8/1992 | Chang . |
| 5,148,355 | 9/1992 | Lowe et al. . |
| 5,182,544 | 1/1993 | Aquilera et al. . |
| 5,218,189 | 6/1993 | Hutchison . |
| 5,241,299 | 8/1993 | Appalucci et al. . |
| 5,276,431 | 1/1994 | Picolli et al. . |
| 5,317,330 | 5/1994 | Everett et al. . |
| 5,353,011 | 10/1994 | Wheeler et al. . |
| 5,367,290 | 11/1994 | Kind et al. .............................. 340/572 |
| 5,373,301 | 12/1994 | Bowers et al. . |
| 5,381,137 | 1/1995 | Ghaem et al. . |
| 5,430,441 | 7/1995 | Bickley et al. . |
| 5,446,447 | 8/1995 | Carney et al. . |
| 5,450,492 | 9/1995 | Hook et al. . |
| 5,481,262 | 1/1996 | Urbas et al. . |
| 5,510,769 | 4/1996 | Kajfez et al. . |
| 5,510,770 | 4/1996 | Rhoads . |
| 5,554,974 | 9/1996 | Brady et al. . |
| 5,574,431 | 11/1996 | McKeown et al. . |
| 5,682,143 | 10/1997 | Brady et al. ............................ 340/572 |
| 5,736,929 | 4/1998 | Schrott et al. . |

*Primary Examiner*—Edwin C. Holloway, III

[57] ABSTRACT

An improved information storage and identification tag includes a substrate, an input mechanism disposed on the substrate and configured to receive a query signal, an output mechanism disposed on the substrate, and a response circuit disposed on the substrate. The response circuit is disposed in operative communication with the input mechanism and the output mechanism and is configured to output via the output mechanism at least one selectable response code in response to receipt of a query signal by the input mechanism.

12 Claims, 19 Drawing Sheets

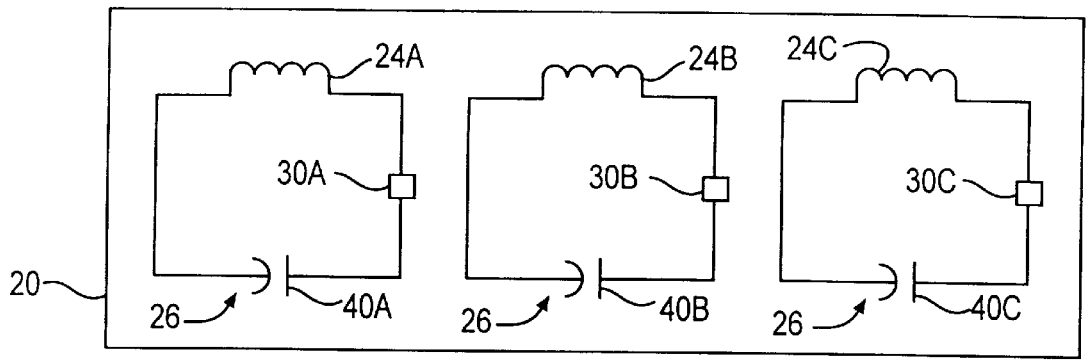
FIG. 23
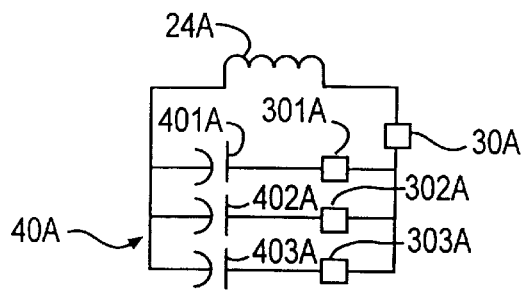 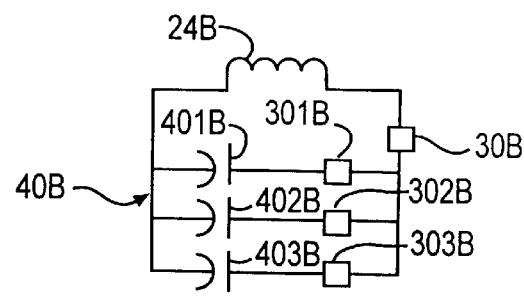
FIG. 24A  FIG. 24B
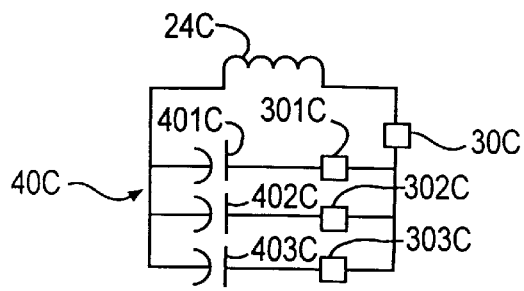
FIG. 24C

INFORMATION STORAGE AND IDENTIFICATION TAG

BACKGROUND OF THE INVENTION

The present invention relates to information storage and identification tags of the type frequently used, for example, as retail product security labels. Generally, information storage and identification tags (hereinafter referred to as "ID" tags) output a predetermined response to some type of query signal. The response may be very simple or relatively complicated and may be used to identify an object and/or to provide some information about the object, for example whether it has been purchased.

One typical ID tag application is a passive radio frequency (RF) tag disposed on an adhesive substrate. These tags are passive in that they operate using the energy of a received query signal. They include an antenna attached to circuitry components which are energized by the received query signal and which, when energized, excite the antenna to transmit a response radio frequency signal.

In use, for example in a retail store security system, RF ID tags attached to store merchandise may be programmed to output a response code at a particular frequency. An RF query signal source is positioned proximate the store exit and outputs an RF query signal. If merchandise carrying one of these tags passes through the exit, the ID circuitry is energized by the signal and outputs a response signal. The response signal is received by a reader which activates an alarm. The reader may be an independent unit or may be associated with the signal source.

Such RF ID tags typically include distinct component parts, such as standard resistors, capacitors and inductors disposed on the tag by standard manufacturing techniques such as pick and place, solder, or bonding. They include a rigid housing to protect the electrical components.

RF ID tags may have various code or memory configurations. The most simple is the single code tag or label typically used by retail stores to deter theft as described above. These labels emit a single response when activated by a reader. The response is a simple yes or no, indicating whether or not the label is present or activated.

Other tags respond with a code including a preset serial number. The response code is preset at the time of manufacture. When activated by the reader, the tag responds with the preprogrammed serial number.

Programmable ID tags typically contain a small memory chip and special electronics that allow programming and reprogramming of the memory chip. The memory capacity of the chips vary, and they may be able to store as little as a programmable serial number or as much as would fill many printed pages of data.

It is also known to provide a plurality of resonant circuits on an RF ID tag, each resonant circuit configured with the tag to output a response signal at a predetermined frequency in response to a query signal. The number of possible different responses is determined by the number of individual circuits and/or the ability to time sequence the responses from the circuit. In such the systems, the ability to provide a relatively large number of different responses is limited by tag surface area and circuit component cost.

SUMMARY OF THE INVENTION

The present invention recognizes and addresses the foregoing disadvantages, and others, of prior art construction and methods.

Accordingly, it is an object of the present invention to provide an improved information storage and identification tag.

More particularly, it is an object of the present invention to provide an information storage and identification tag that may output a selectable response signal in response to a query signal.

It is a still further object of the present invention to provide an improved radio frequency information storage and identification tag.

It is yet another object of the present invention to provide an improved active or passive radio frequency storage and identification tag which is small and capable of inexpensive mass production.

It is a still further object of the present invention to provide an improved active or passive radio frequency information storage and identification tag which may be mass produced in an uncoded state and which may be selectively coded by an end-user, or at the time of manufacture, to output one of a large number of possible response signals in response to a query signal.

Some of these objects are achieved by an information storage and identification tag comprising a substrate, an input mechanism disposed on the substrate and configured to receive a query signal, and an output mechanism disposed on the substrate. A response circuit is also disposed on the substrate in operative communication with the input mechanism and the output mechanism. A response circuit is configured to output via the output mechanism selectable response signal in response to receipt of a query signal by the input mechanism. At least one of the input mechanism, the output mechanism and the response circuit includes at least one electrical lead at least partially controlling electrical operating characteristics thereof or electrical communication thereamong and has a connection position at which electrical communication along the lead may be selectively enabled to at least partially select the response signal.

In a preferred embodiment, the tag is a passive radio frequency (RF) device, particularly for use with ID labels. The tag construction could also, however, be used in non-RF configurations, where, for example, communication with the tag is effected through electrical contact points.

Preferably, passive labels include response circuitry that includes one or more code circuits. A code circuit is a group of circuit elements or components which responds to a query signal to output a response code. The response code may, for example, be in the form of signal pulses and may be defined by the number of such pulses, the duration of the pulses, and/or the interval between the pulses. That is, the response code is the time-domain part of the response signal output by the label. Predetermining the response code is one way of storing information on a label. As discussed in more detail below, information may also be stored by predetermining the frequency domain part and/or the amplitude of the response signal.

In one preferred embodiment, the response circuitry includes one or more code circuits, each configured to output a unique response code among the code circuits. The code circuits are selectably connected to one or more input/output mechanisms, which may be, for example, an antenna or an electrical contact point. The code circuits are connected to the input/output mechanisms by electrical leads, one or more of the electrical leads defining an open that prohibits electrical communication between the code circuits and the input/output mechanisms. Since the tags do not respond to a query signal until desired opens are filled, selective filling of the opens determines which response codes are output in the response signal.

In a preferred embodiment, the input/output mechanisms are one or more antennas configured to receive and transmit signals at a predetermined frequency. A connection between any given code circuit and a given antenna determines a response code and frequency at which that response code will be generated and output in the response signal. Selective connection of the code circuits and the antennas determines the response code/frequency combinations that comprise the response signal. For example, a tag having two code circuits configured to output different codes, two antennas configured to receive and transmit at different frequencies, and four electrical leads having opens defined thereon and extending between the code circuits and the antennas in the four possible combinations, would have eight possible responses to a query signal depending upon which of the four opens are filled.

Various configurations are suitable within the present invention. For example, a single code circuit may be selectably connected to a plurality of antennas or vise versa. The frequency of the response signal may be made selectable by placing opens in the antenna, within the code circuits, or between the code circuits and the antenna. Opens may also be provided in the code circuits between or within their components to enable selective determination of the response code that a given code circuit will output. The amplitude of the response signal may be made selectable by providing opens in the antennas or within or between appropriate components in the code circuits.

In another preferred embodiment, electrical communication within the code circuits, between the code circuits and the input/output mechanisms, and/or within the input/output mechanisms are initially enabled. The tag is provided, however, with punch through positions at which electrical communication may be severed. For example, electrical leads between code circuits and antennas maybe severed to disable electrical communication therebetween. The unsevered connections thus determine which response codes will be output at which frequencies.

Preferably, the code circuits are passive circuits. That is, the components of the code circuits are energized by energy received from an antenna or a contact point, causing the code circuit to output a response code back to the antenna or contact point. The code circuits contain no independent power source.

Additionally, the response circuitry may be constructed by printed circuitry techniques, for example by printing conductive ink, such as a conductive polymer, onto a substrate with a plotter, ink jet printer, screen printer, offset printer or similar device or process. The antenna or contact point may also be printed onto the substrate, enabling the printing of the entire tag. The tags may be inexpensively mass produced using such printed circuit techniques. Furthermore, by using the open circuits and punch through positions, a single mass produced tag configuration allows the end user, or the manufacturer prior to shipment to the end user, to select individual tag settings.

The accompanying drawings, which are incorporated and constitute a part of the specification, illustrate preferred embodiments of the invention and, together with the description, serve to explain the principles of the invention.

BRIEF DESCRIPTION OF THE DRAWINGS

A full and enabling disclosure of the invention, including the best mode thereof, directed to one of ordinary skill in the art, is set forth in the specification, which makes reference to the appended drawings, in which:

FIG. 23 is an electrical diagram representation of an exemplary resonant circuit for use in an information storage and identification tag constructed in accordance with the present invention;

FIG. 24A is a partial electrical diagram representation of the exemplary resonant circuit as in FIG. 23;

FIG. 24B is a partial electrical diagram representation of the exemplary resonant circuit as in FIG. 23; and FIG. 24C is a partial electrical diagram representation of the exemplary resonant circuit as in FIG. 23.

Figure 1A:
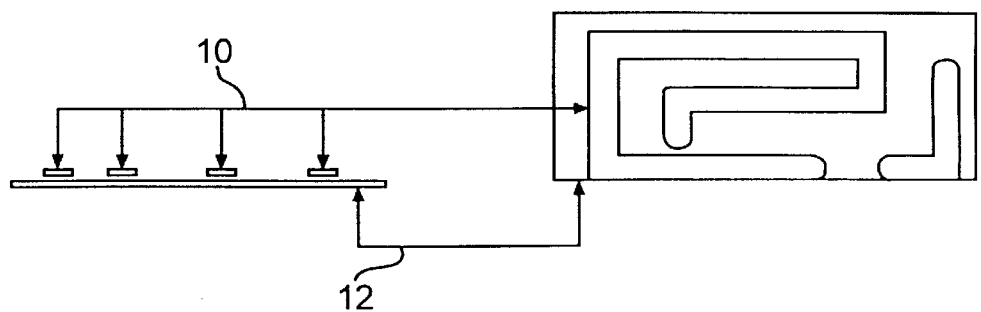
FIG. 1A is a side view and plan view of a partially constructed information storage and identification tag constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved information storage and identification tag ("ID" tag). Preferably, the tag includes a substrate upon which a multiple-layer circuit is printed. As those of ordinary skill in this art should understand, a variety of printed circuit techniques may be employed, for example using conductive inks printed by ink pens, ink jet printers, plotters, etc. on substrates such as paper, plastic, ceramics, glass, metal or other suitable materials.

Figure 1B:
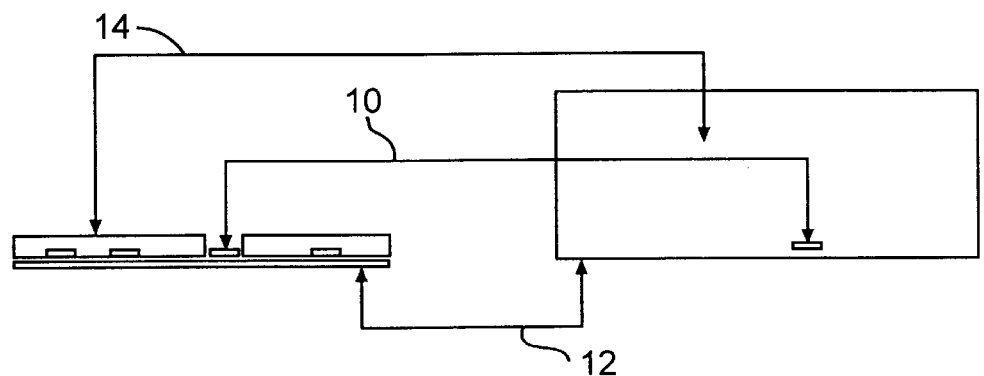
FIG. 1B is a side elevation and plan view of a partially constructed information storage and identification tag constructed in accordance with the present invention.
Figure 1C:
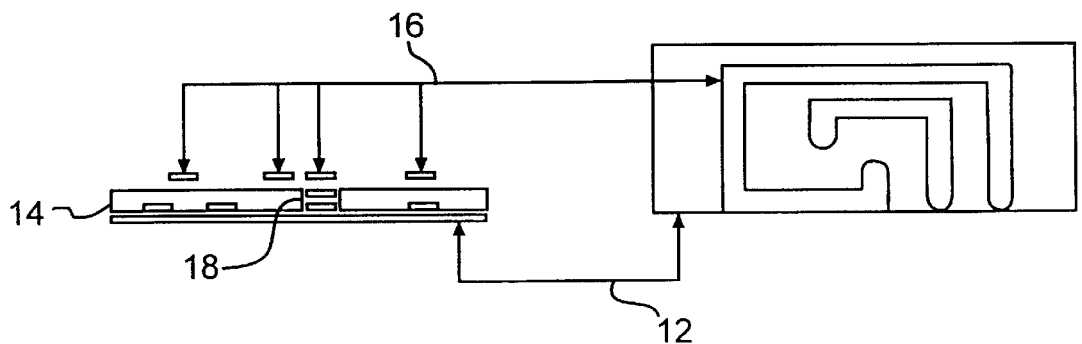
FIG. 1C is a side elevation and plan view of an information storage and identification tag constructed in accordance with the present invention.

Accordingly, FIGS. 1A through 1C illustrate the construction of a multi-layer circuit using, for example, a screen printing to apply successive layers of conductive and dielectric polymer to form a multiple layer circuit pattern. For example, referring to FIG. 1A, a layer of conductive polymer 10 is applied in a circuit pattern to a substrate 12. After the conductive layer is cured, for example by infrared of ultraviolet light, a non-conductive or dielectric polymer 14 (FIG. 1B) is applied to insulate first conductive layer 10 for the application of subsequent layers. Referring to FIG. 1C, a second conductive layer 16 is disposed upon non-conductive layer 14. A gap 18 is left in non-conductive layer 14 to permit electrical communication between the conductive layers 10 and 16 as desired.

Using the above-described printed circuit process, very thin and light RF ID labels may be produced. For example, substrates as thin as 0.002 inches may be accommodated. The circuitry may be printed, however, on various types of substrates, for example from thick sheets of rigid material to rolls of very thin flexible material.

Figure 2:
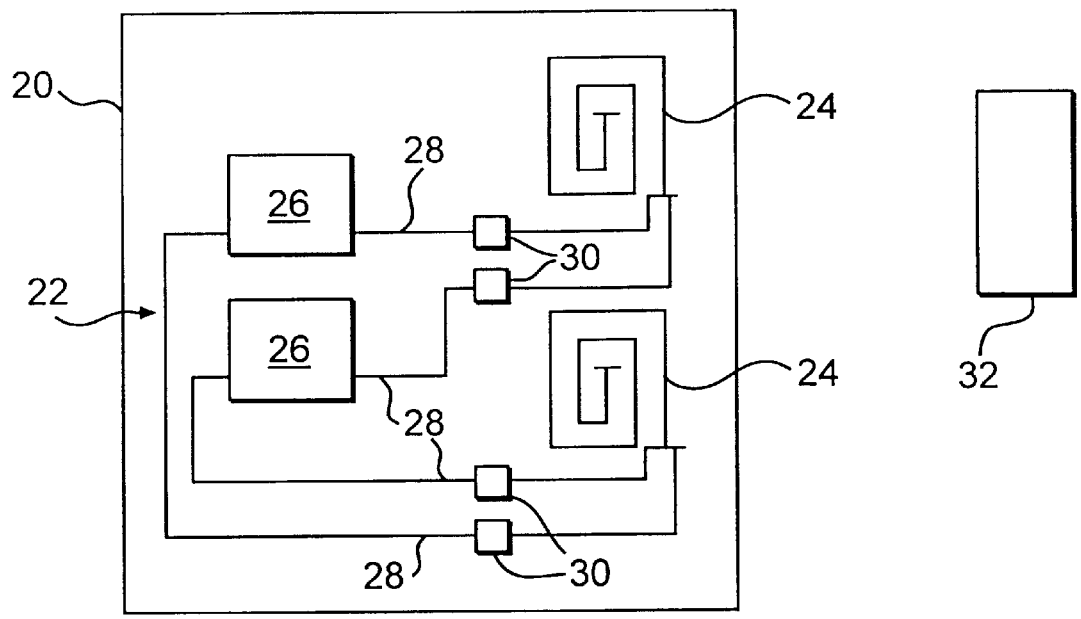
FIG. 2 is a schematic illustration of an exemplary circuitry layout for an information storage and identification tag constructed in accordance with the present invention.

Such printed circuit techniques, or others, may be used to manufacture an information storage and identification tag 20 as shown in FIG. 2. Tag 20 includes a response circuit 22 in communication with two antennas 24. Response circuit 22 includes two code circuits 26 electrically connected to antennas 24 by electrical leads 28. Electrical leads 28 define selectable communication positions 30 which may be either open positions or punch through positions.

If selectable communication positions 30 are opens, there is no electrical communication between code circuits 26 and antennas 24 at the time tag 20 is produced. As described below, however, the selective filling of positions 30 with conductive material, for example the same conductive material used to construct response circuit 22 and antennas 24, determines which of the code circuits 26 are connected to the antennas 24. Thus, the selective filling of positions 30 determines the response of tag 20 to a query signal emitted by signal source/reader 32.

If positions 30 are punch through positions, electrical communication is initially enabled between code circuits 26 and antennas 24. To establish the response of tag 20, holes are selectively punched through tag 20 at positions 30.

Each code circuit 26 is configured to output a particular response code to one or more of antennas 24 in response to a query signal received from antennas 24. Preferably, the response code is comprised of one or more signal pulses, the specific code being defined by the number of pulses, the individual duration of each pulse, and/or the interval between pulses. These three parameters may be varied to form a unique time-domain signature for each code circuit 26.

Figure 13:
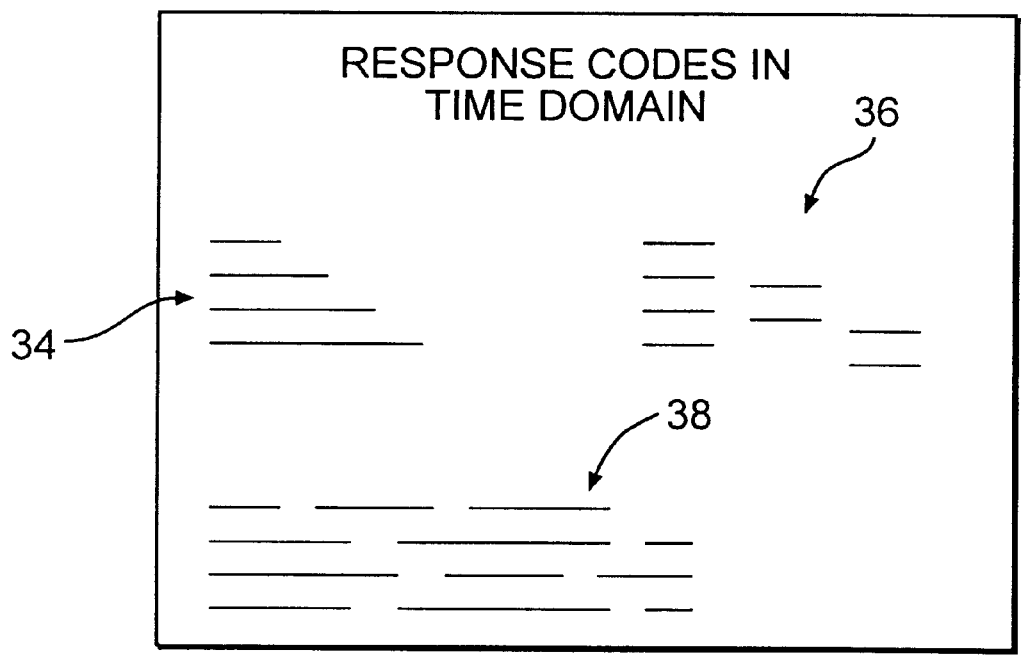
FIG. 13 is an illustration of exemplary response code configurations for use with an information storage and identification tag constructed in accordance with the present invention.

For example, exemplary response codes are illustrated in FIG. 13. Twelve unique response codes 34, 36 and 38 are illustrated. The four response codes 34 vary by duration of the pulses. The response codes 36 have pulses of the same duration, but vary in the number of pulses and in the interval between pulses. The response codes 38 have multiple pulses that vary in duration.

The particular response code output by a code circuit may be determined by the circuitry of the code circuit. Exemplary components used in the circuits are capacitors, resistors and inductors.

Capacitors are formed by alternating flat layers of conductive and non-conductive material to form a multiple layer sandwich. In a printed circuit application, capacitors may be manufactured by printing alternating layers of conductive and dielectric polymers. The capacitance value and discharge rate generated by a given design is determined by the geometric size and shape of the alternating conductive and dielectric layers (the larger the surface area the greater the capacitance) and the number of layers used for any given design (the more layers the greater the capacitance).

Similarly, predefined geographic areas of conductive polymer may be separated by a preset distance to form an inductor. The value of the inductor may be varied by changing the geometry of the printed design.

Referring again to FIG. 2, code circuits 26 may be active or passive. If passive, they are energized by the query signals and, using this energy, output the response codes to the antennas. Thus, if antennas 24 are configured to receive and transmit radio frequency signals, tag 20 may be described as a passive radio frequency (RF) ID tag. If active, a power source and transmitter circuit are provided.

As described above, each code circuit 26 may be configured to output its own response code in response to a query signal received by antennas 24. That is, the code circuits may be configured so that they differ in their time-domain response. In another preferred embodiment, however, the code circuits output the same time-domain response but do so such that the resulting response signal for each is transmitted at a different frequency. Furthermore, the code circuits may be constructed so that they differ in both time-domain and frequency response.

The output frequency may be chosen in various manners. For example, antennas 24 may have different lengths, numbers of turns, or diameters so that each receives and transmits at a different frequency range. The antennas may be constructed so that certain of these characteristics are selectable. The particular frequency within the frequency range may be determined by the value of certain components, for example capacitors, within the code circuits, and, in another preferred embodiment, the code circuits are constructed so that the frequency may be fine-tuned by selecting the values of, or the connections between, such components. Selectable connections between code circuits and antennas may be used to select specific combinations of these frequency characteristics. Thus, the frequency at which tag 20 responds is another variable that may be selected to provide a unique response signal for the tag. Since no selectable connections are provided in the code circuits 26 in FIG. 2, output frequency is selected by selecting a connection between a given code circuit and a given antenna.

In general, the resonant frequency F of a tuned circuit may be represented by:

$$F = (1/2\pi)(LC)^{1/2},$$

where C is capacitance (in farads) and L is inductance (in henrys). Inductance is, in turn, a function of antenna diameter, antenna length, and the number of antenna turns. Thus, the resonant frequency of a circuit as in FIG. 2 may be selected by determining circuit capacitance, antenna length, antenna diameter, and/or antenna turns. Antennas 24 in FIG. 2 are printed using conductive inks. Therefore, antenna lengths, turns and diameter may be set as a part of the printing process. To permit frequency selection at the antenna, open or punch through positions may be defined within the antenna so that its length and the number of its turns may be selected at the time of manufacture or at an end-use location.

The amplitude, i.e. the strength, of the response signal is also a function of the tag circuitry. For example, the amount of current flow of coupled circuit patterns in a tag as in FIG. 2 is a function of the number of antenna turns and the area of the antenna coil. Thus, adjusting the length, which adjusts the area, of the antenna coil, or the number of its turns, also adjusts the amplitude of the response signal. Accordingly, the response signal includes, for example, three components which may be selectively determined to determine a particular response signal for a tag: (a) frequency response, (b) time-domain response, and (c) amplitude.

Referring again to FIG. 2, and assuming that one or both antennas 24 are connected to a code circuit 26 to establish one or two resonant circuits, reader 32 cycles through a range of frequencies to "read" the tag. Each antenna 24 receives a query signal only at its operating frequency. Each resonant circuit is energized by the query signal at its operating frequency and provides its maximum response to the reader at that frequency. Preferably, the tag responds at the same frequencies at which the reader transmits the query signal.

Preferably, reader 32 uses one of two methods for transmitting query signals and reading the frequency of a tag's response signal. In the "pulse" method, reader 32 transmits short signals, or pulses, over a range of frequencies including the frequency ranges of each antenna. A resonant circuit receiving one of these query signals at its operating frequency begins to resonate and continues to resonate after the query signal ends, at which point reader 32 detects the response signal.

In the "continuous" method, reader 32 transmits a continuous query signal, sweeping through a range of frequencies including the frequency ranges of the antennas on the tag. Reader 32 acts as both a transmitter and a receiver and, thus, detects the presence of its own transmitting query signal. When the query signal reaches a resonant frequency for the tag, a response signal is generated as discussed above. Reader 32 then detects an increased signal strength, identifying a particular resonant frequency in the response signal for the tag.

In FIG. 2, there are two available response codes, generated by respective code circuits 26, and two available antennas 24 which will operate at different frequencies when connected to the code circuits. Assuming that both code circuits 26 are not simultaneously connected to a single antenna, there are eight response code/output frequency combinations possible for the tag. That is, there are eight possible response signals. A particular response signal may be selected by enabling or disabling electrical communication along leads 28 at communication positions 30.

Reader 32 is a programmable RF signal source and reader. It is programmed in accordance with the specific frequency and time domain information required to identify a specific set of response signals from tags 20. That is, although a tag 20 may be configured to have a very large number of selectable response signals, reader 32 may be programmed to look only for a limited number of these signals. Thus, reader 32 may be used to find particular items, for example, luggage and mail, where each item has a tag 20 coded to output an identifying response signal.

Reader 32 may be programmed to interpret the response signal and translate it to a code word readable by a human operator. Custom programs and data libraries may be generated that assign specific code words to the response signal. For example, one set of code words might be names of specific products, or might be serial numbers associated with particular items. The code words or numbers assigned to any set of response signals may be established via software in reader 32.

Accordingly, tags 20 may be used in a variety of RF ID tag/label applications. Since they may be, for example, approximately 300 microns thick, these tags can be unobtrusive. If they are printed on a flexible adhesive substrate, they can be easily applied to products and wrapped around curved surfaces. Furthermore, the printing process permits low-cost mass production and eliminates the need for sensitive electrical components, thereby diminishing the likelihood that the tags will be inoperatively damaged. Additionally, the configuration of the code circuits and the input/output mechanisms can permit a very large number of possible analog response signals, which may be set at the time of manufacture or at the end-use location.

Figure 4:
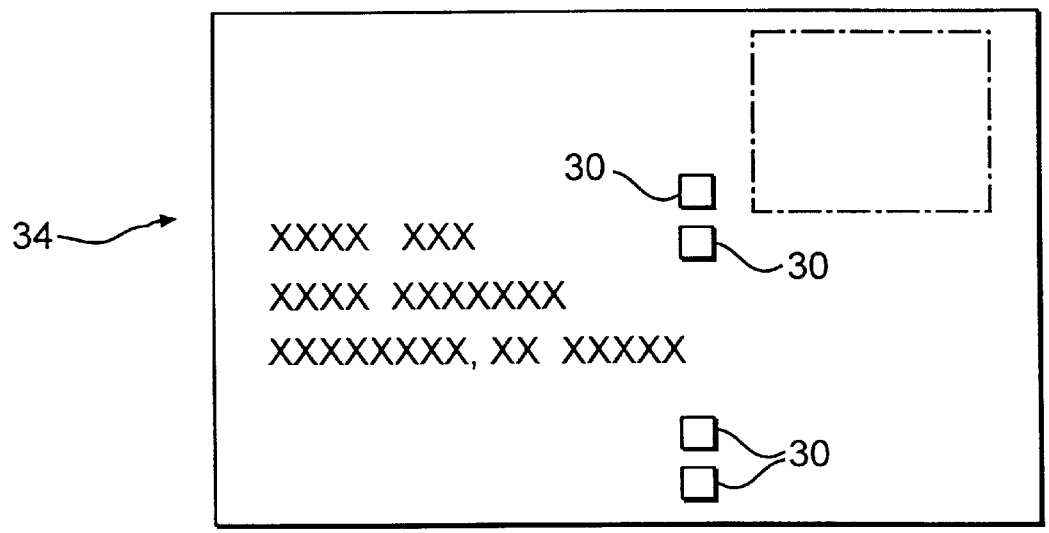
FIG. 4 is a plan view of an information storage and identification tag constructed in accordance with the present invention.

For example, a mailing label 34 is illustrated in FIG. 4. The label may include a response circuit (not shown) and antennas with selectable positions 30 so that information about the mail to which tag 34 will be attached may be coded. Depending upon the configuration of the response circuit and the antennas, and the number of positions 30, the tag may be coded with a variety of information, including a zip code and/or street address.

Figure 6:
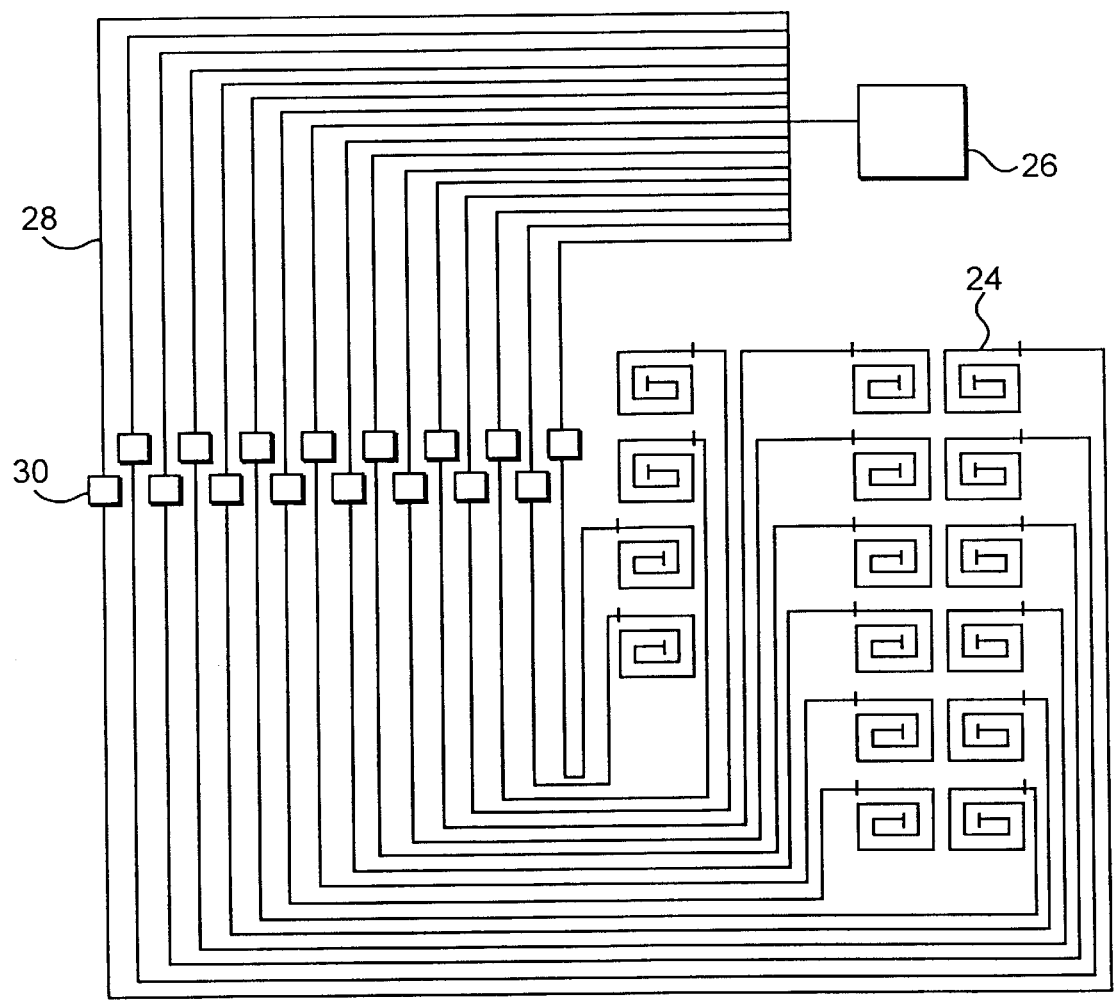
FIG. 6 is a schematic illustration of an exemplary circuitry layout for an information storage and identification tag constructed in accordance with the present invention.

ID tag response circuits and antenna patterns may be constructed in a variety of suitable configurations. For example, FIG. 6 illustrates a multi-frequency design. Sixteen different antennas 24 are selectably connected to a single code circuit 26 that generates one specific response code when activated. Each antenna 24 is tuned to operate at a slightly different frequency in conjunction with code circuit 26 by varying the lengths at which the antennas are printed. Open circuit positions 30 are left in the leads 28 between the antennas and the code circuit. If code circuit 26 can output a single response code, there are over 65,000 possible response signals to which the circuitry of FIG. 6 may be set.

To read the response signal, reader 32 (FIG. 2) cycles through each of the sixteen frequencies, transmitting, for example, a short query signal burst at each frequency range and recording the response. The specific response for the label is determined by the combination of frequencies at which signals are received.

Figure 3:
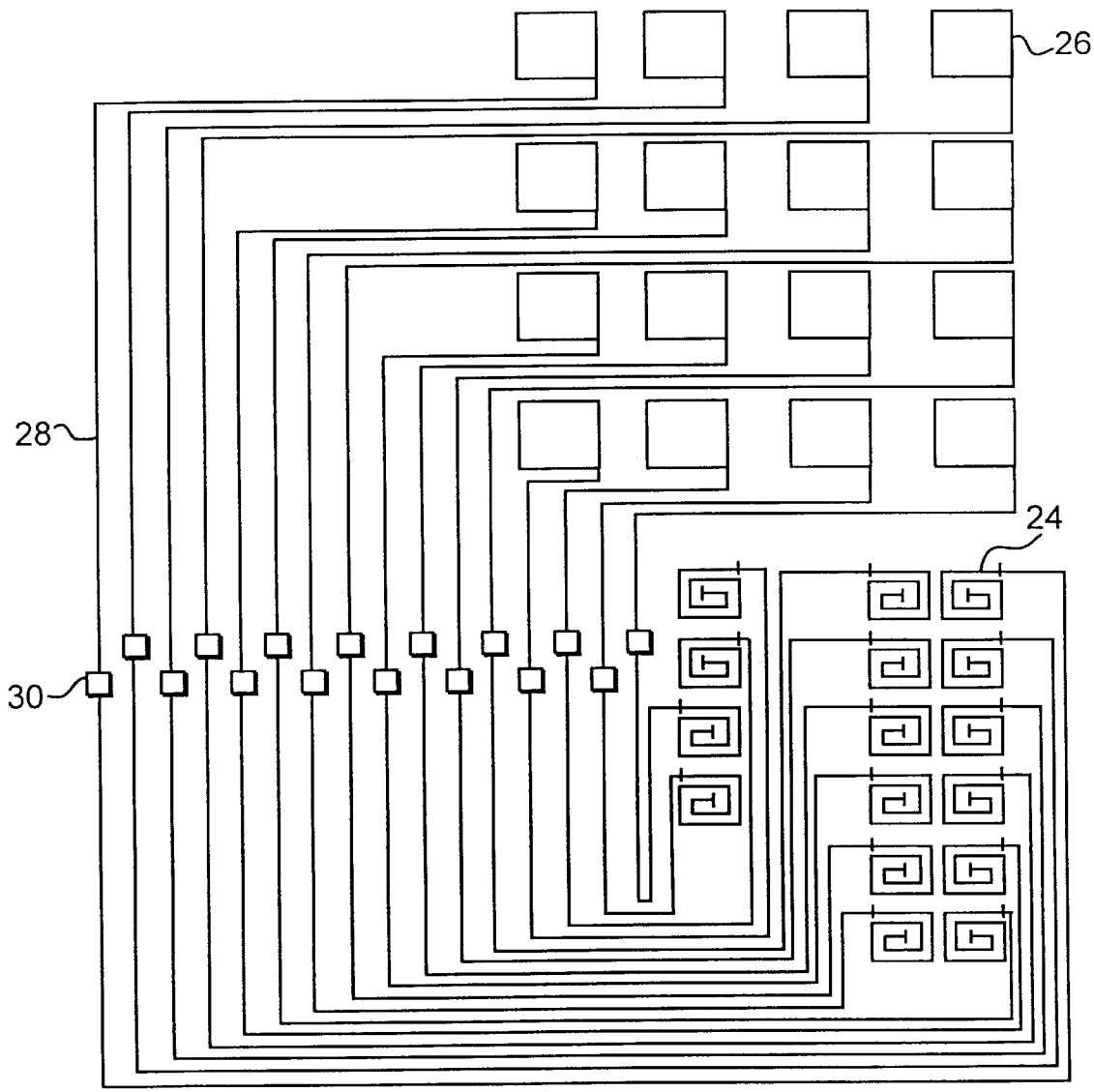
FIG. 3 is a schematic illustration of an exemplary circuitry layout for an information storage and identification tag constructed in accordance with the present invention.
Figure 5:
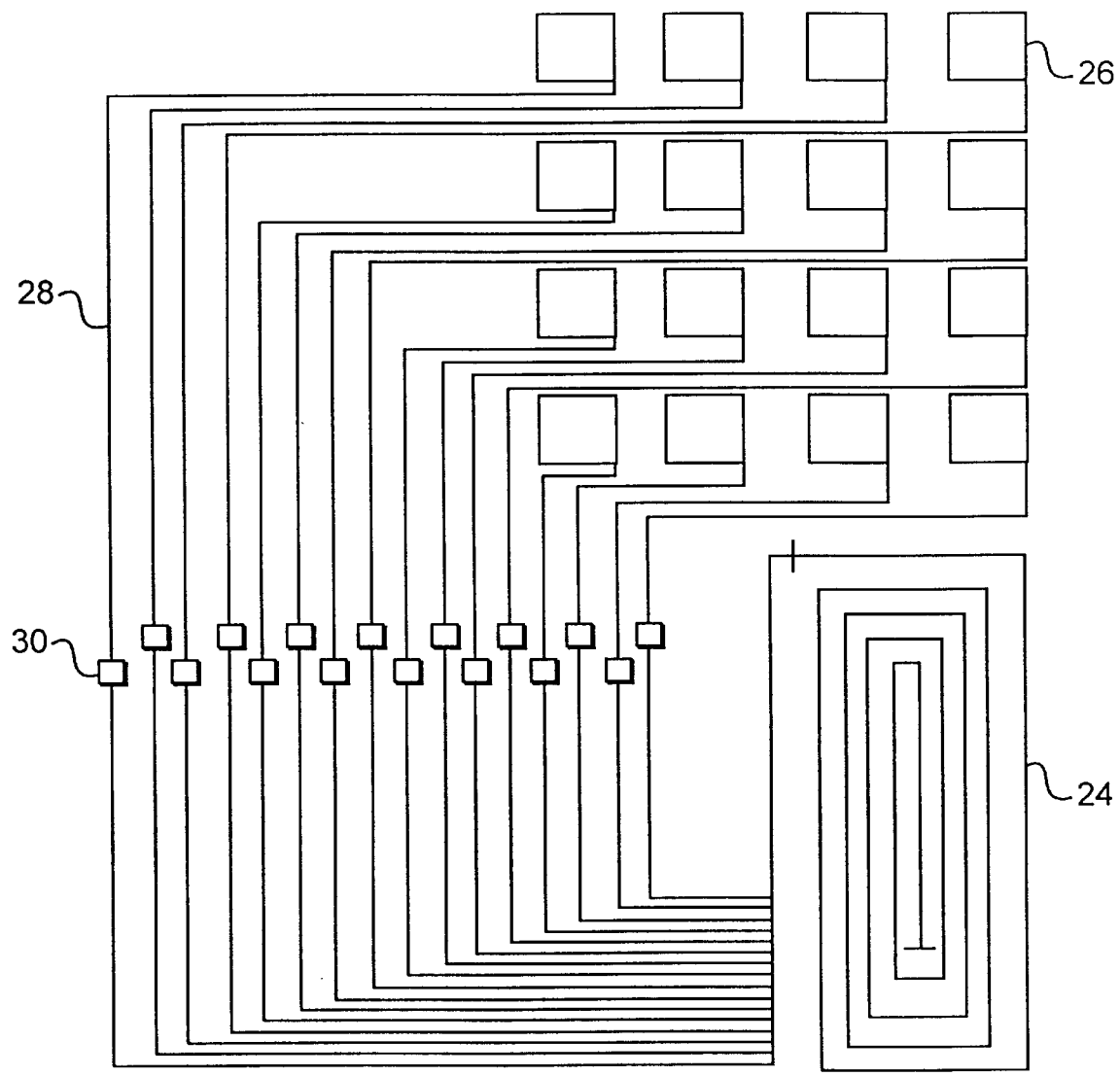
FIG. 5 is a schematic illustration of an exemplary circuitry layout for an information storage and identification tag constructed in accordance with the present invention.

Similarly, as shown in FIG. 5, multiple code circuits 26 may be selectably connected to a single antenna 24. In FIG. 3, sixteen code circuits 26 are selectably connected to sixteen antennas 24. There is a one-to-one correspondence between each code circuit 26 and an antenna 24.

Figure 7:
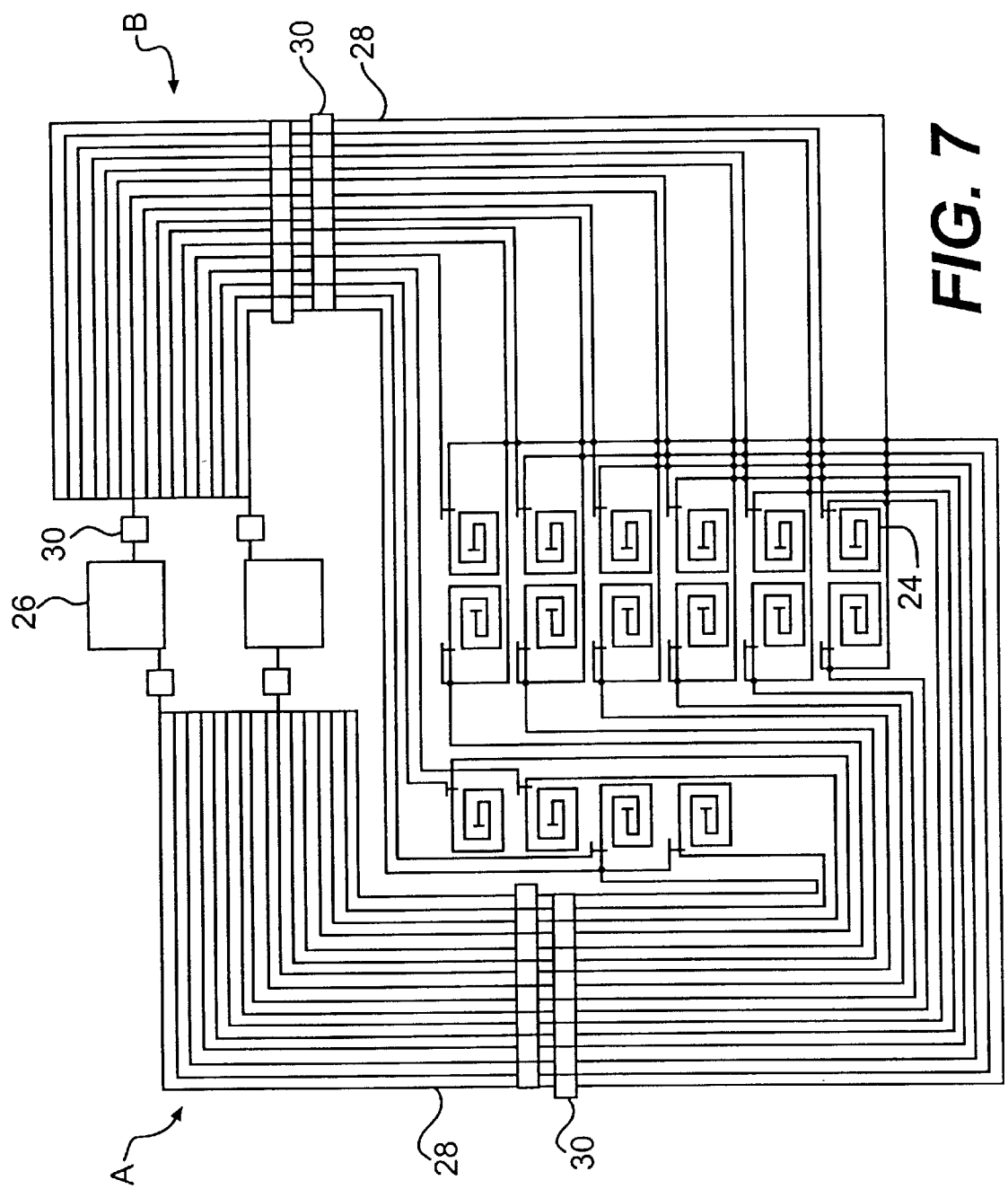
FIG. 7 is a schematic illustration of an exemplary circuitry layout for an information storage and identification tag constructed in accordance with the present invention.

In the design shown in FIG. 7, each lead 28 of group A is connected to a single antenna 24, and each lead 28 of group B is connected to a single antenna 24. Thus, there are two leads 28 connected to each antenna. Each of the code circuits 26 may be selectively connected to either the group A leads or the group B leads. Provided that both code circuits 26 should not be connected to the same group at the same time and that no antenna should be simultaneously connected to both code circuits 26, there are over one billion possible response signals.

Figure 14:
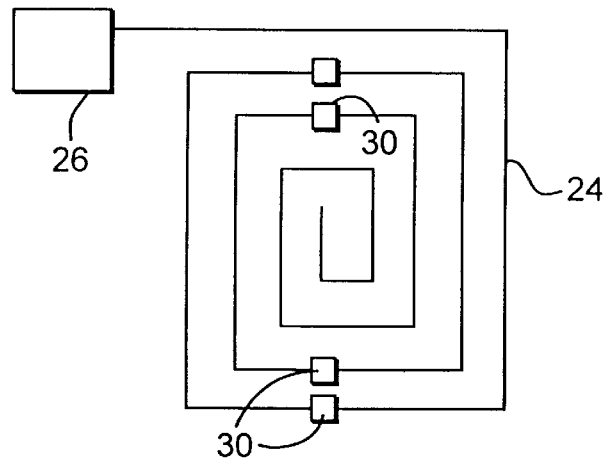
FIG. 14 is a schematic illustration of an exemplary circuitry layout for an information storage and identification tag constructed in accordance with the present invention.

The selectable connections need not be only between the code circuits and the antennas. For example, referring to FIG. 14, opens, or punch through positions, 30 may be provided in antenna 24 to generate a multiple length antenna. As the open circuits 30 are filled in, or as the punch through positions 30 are punched through, the length of the antenna is extended or shortened, and the frequency at which the circuit will transmit the response signal in conjunction with a code circuit is changed. In this example, assuming positions 30 are opens, the four opens 30 create four possible antenna lengths.

Figure 8:
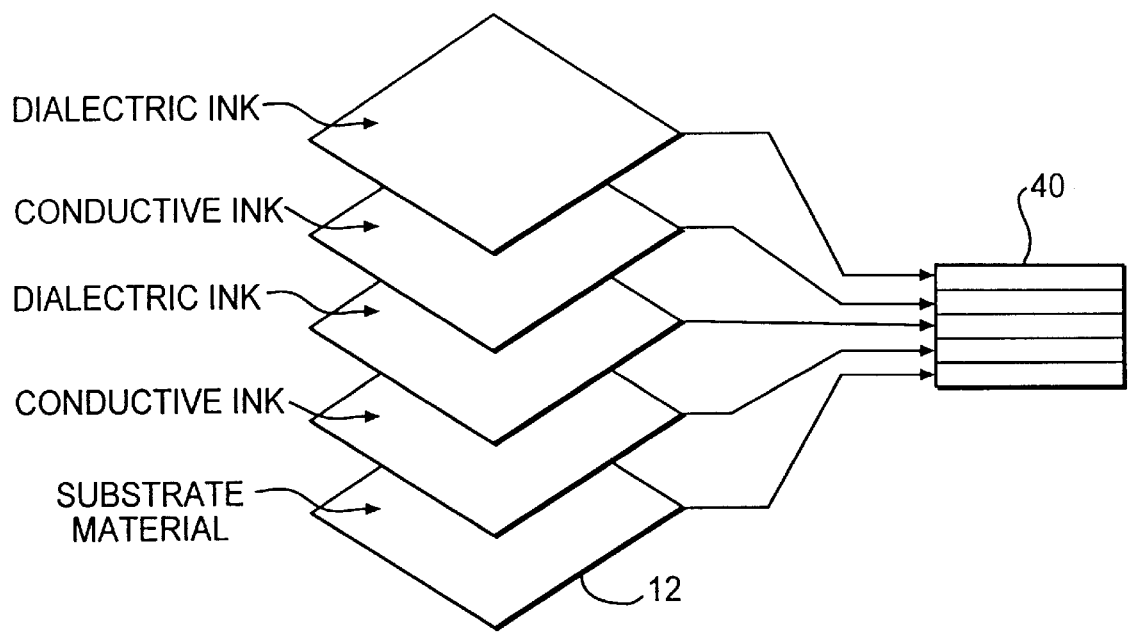
FIG. 8 is a diagrammatic illustration of a layered construction of an information storage and identification tag constructed in accordance with the present invention using printed circuit techniques.

A construction of a printed circuit capacitor is illustrated in FIG. 8. Capacitor 40 is constructed by depositing alternating flat layers of conductive and non-conductive material on a substrate 12. The layers of conductive ink form the conductive plates, the capacitance being directly related to the surface area of each plate. It is possible to adjust the value of the capacitor by changing the surface area of the conductive plates.

Figure 9A:
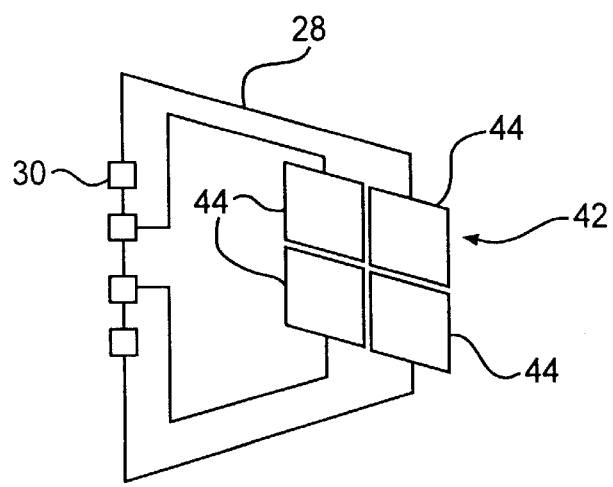
FIG. 9A is a partial diagrammatic illustration of a component of a code circuit constructed in accordance with the present invention.
Figure 9B:
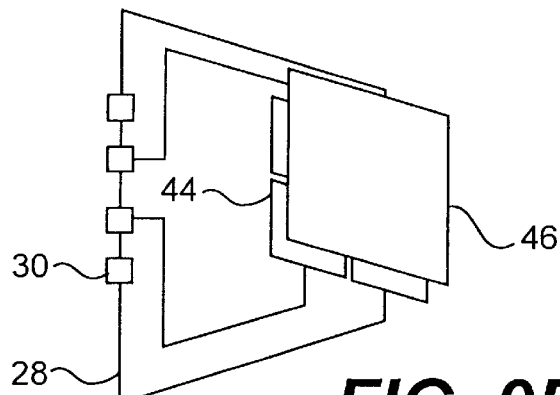
FIG. 9B is a partial diagrammatic illustration of a component of a code circuit constructed in accordance with the present invention.
Figure 9C:
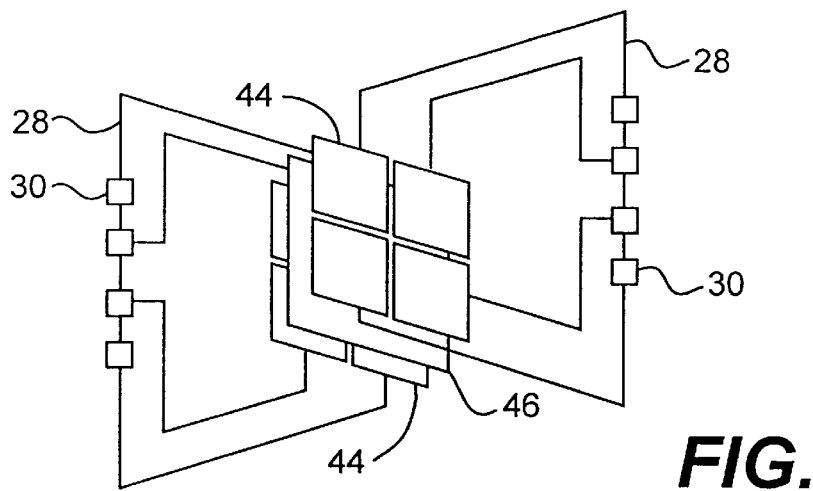
FIG. 9C is a partial diagrammatic illustration of a component of a code circuit constructed in accordance with the present invention.
Figure 9D:
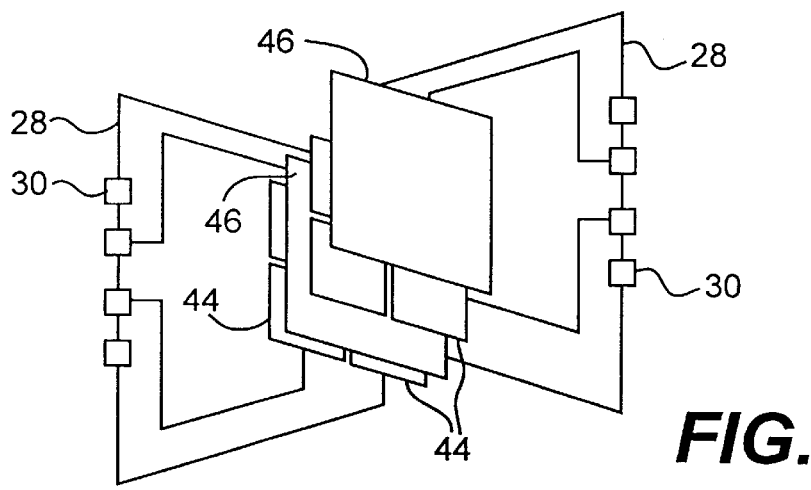
FIG. 9D is a partial diagrammatic illustration of a component of a code circuit constructed in accordance with the present invention.
Figure 9E:
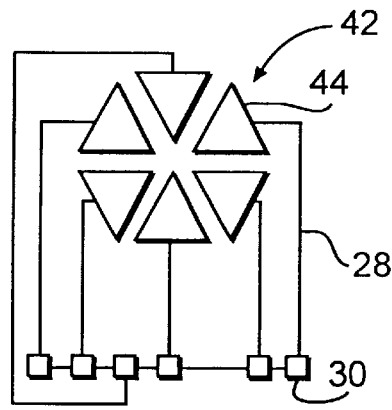
FIG. 9E is a partial diagrammatic illustration of a component of a code circuit constructed in accordance with the present invention.
Figure 9F:
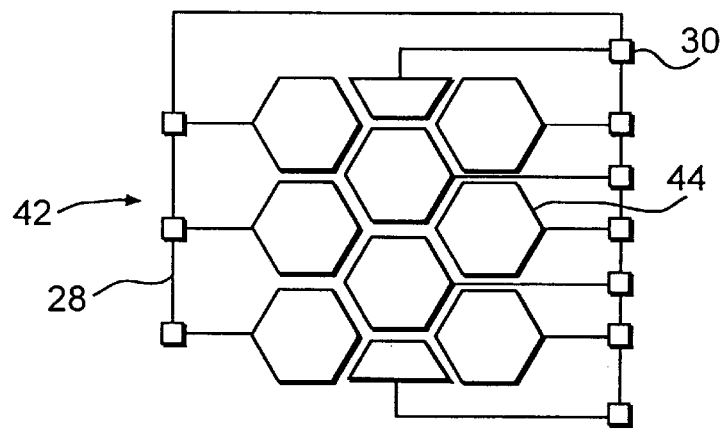
FIG. 9F is a partial diagrammatic illustration of a component of a code circuit constructed in accordance with the present invention.
Figure 9G:
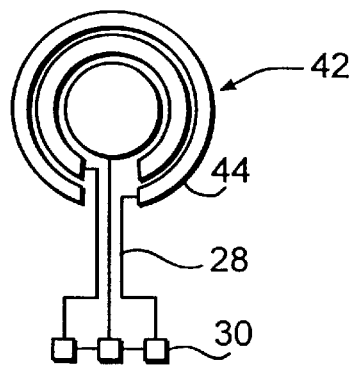
FIG. 9G is a partial diagrammatic illustration of a component of a code circuit constructed in accordance with the present invention.

As shown in FIG. 9A, a conductive plate within the capacitor may be divided into multiple panels. These panels are connected to each other by conductive traces, or leads, 28 to form the equivalent of a solid conductive panel. Opens 30 are defined within the leads, thus disabling one or more of the panels 44. At the time of issue, an ink pen, ink jet printer, plotter, etc. loaded with conductive ink may be used to fill in selected circuit paths to adjust the value of the capacitor. FIGS. 9B, 9C and 9D illustrate how subsequent non-conductive layers 46 and capacitor plates 42 may be added to produce a multi-value capacitor, the value of which is determined by selective connection or disconnection of leads 28. FIGS. 9E, 9F and 9G illustrate that capacitor plates 42 may have various sized and shaped panels 44 to form complex capacitor designs capable of returning multiple values depending upon the selection of panel areas on the capacitor plates.

A similar process may be used to adjust the value of resistors. Conductive inks are available in a range of resistive values. Thus, the choice of such inks may determine the value of a resistor used in a code circuit 26. Furthermore, for a conductive ink with a given resistive value, the value of a printed trace is determined by the width and length of the trace and the height of the material. For two traces with the same height and length, the trace with the larger width will be more conductive.

Figure 10:
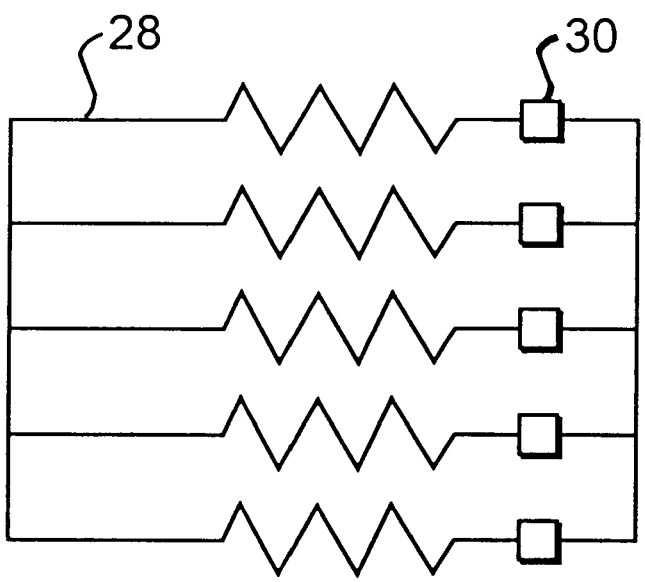
FIG. 10 is a schematic illustration of selectively connected components for use in a code circuit in an information and identification tag constructed in accordance with the present invention.

However, a lower resistive value for a given trace width may be achieved by parallel connection of multiple traces. As illustrated in FIG. 10, the provision of selectable connections in the parallel resistor pattern provides a selectable resistor value for the parallel combination. The resistive value may be used to determine the current flow in the circuit and/or the discharge rate of a capacitor. Depending on the construction of the particular circuit, a selectable resistor value could be used to selectively determine the amplitude and/or the response code configuration of the response signal.

Multiple value capacitors may be used to tune a circuit to a desired resonant frequency. FIG. 23 illustrates a tag 20 having three separate resonant circuits, each having a selectable frequency response. Each circuit includes a code circuit 26 connected to an antenna 24A, 24B, or 24C. Each code circuit includes a capacitor 40A, 40B, or 40C connected to its respective antenna by an open position 30A, 30B or 30C. Each antenna has a specific length and configuration so that it will transmit at a frequency range different from the other antennas. Selectable connections may be provided in the antennas so that antenna geometry may be selected to tune the antenna to a particular frequency range. Selectable connections within the code circuit may then be used to tune the circuit to a specific frequency within the frequency range of the antenna pattern. Selectable connections within the antenna pattern are discussed below and, for ease of explanation, are not included in the examples of FIGS. 23 and 24. Similarly, selectable interconnections between the code circuits and antennas of the three resonant circuits are not illustrated.

Each antenna pattern may be attached to a multiple value capacitor so that the resonant frequency may be selected. Each capacitor 40A, 40B and 40C may be constructed to have multiple values as discussed above. Assuming the capacitors are constructed to have three selectable values, each may be represented electrically by three parallel capacitors 401, 402 and 403 as illustrated in FIGS. 24A, 24B and 24C. The selectable capacitor values are additive, providing seven possible values for each. Referring to FIG. 24A, the selectable values for capacitor 40A are:
401A,
402A,
403A,
401A and 402A,
401A and 403A,
402A and 403A, and
401A, 402A and 403A.
Similar combinations are available for the capacitors illustrated in FIGS. 24B and 24C.

The capacitors in FIGS. 24A, 24B and 24C are connected to their corresponding antennas by opens 30A, and 30B and 30C, respectively. By selectively filling these opens, one of seven possible antenna combinations for the tag may be chosen:
24A,
24B,
24C,
24A and 24B,
24A and 24C,
24B and 24C, and
24A, 24B and 24C.

Selection of a particular antenna combination determines the frequency ranges for the resonant circuits. Selective filling of the opens in the capacitors determines the particular frequency at which each circuit will operate within its frequency range. Since seven capacitor combinations are possible for each antenna, 511 response signals are possible:

| | |
|---|---|
| 24A | 7 |
| 24C | 7 |
| 24C | 7 |
| 24A and 24B | 49 |
| 24A and 24C | 49 |
| 24B and 24C | 49 |
| 24A, 24B and 24C | 343 |
| TOTAL | 511 |

The number of combinations may be increased by constructing the antennas to have selectable frequency ranges and/or selectably interconnecting the code circuits of one resonant circuit with the antennas of the others. In the latter configuration, the code circuits should be configured to output different responses, either in the time-domain or the frequency domain.

Figure 11:
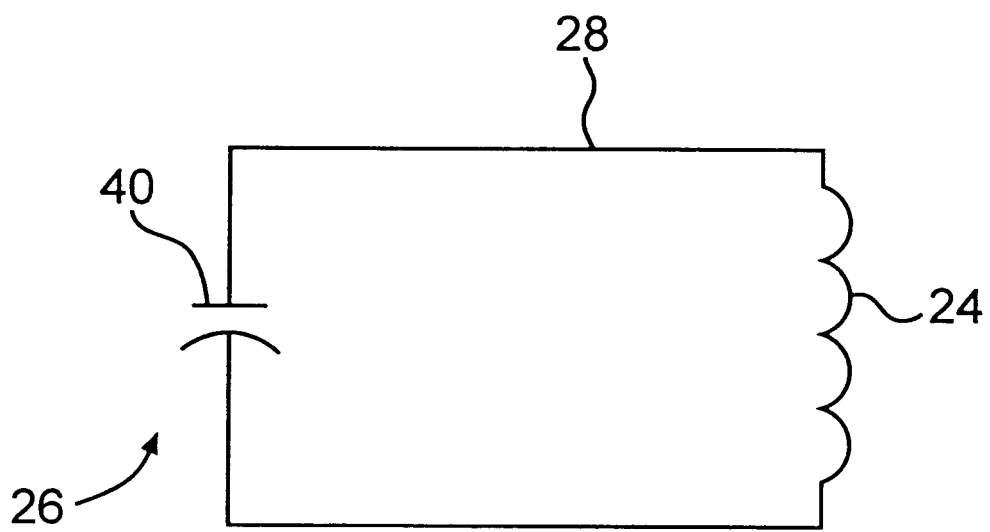
FIG. 11 is an electrical diagram representation of an exemplary resonant circuit for use in an information storage and identification tag constructed in accordance with the present invention.

To illustrate the operation and construction of a passive printed circuit RF ID tag, a simple resonant circuit like those presented in FIG. 23 is shown in FIG. 11. The circuit of FIG. 11 includes a code circuit 26 comprising a capacitor 40. Code circuit 26 is connected to an antenna 24 by leads 28, which have an electrical resistance. Together, code circuit 26, leads 28, and antenna 24 comprise a resonant circuit. As illustrated in later figures, open circuits or punch through positions may be provided in antenna 24 and/or capacitor 40 and/or leads 28 (if multiple code circuits or antennas are used) to enable a selectable response signal from the circuitry. For ease of explanation of the operation and construction of the circuitry, the selectable connections have been omitted in FIG. 11.

Being passive, the resonant circuit of FIG. 11 derives its power from the RF signal generated by the RF transmitter, reader 32 (FIG. 2). The capacitor and the antenna form a resonant circuit that resonates at a specific frequency. Specifically, capacitor 40 alternatively charges and discharges at a specific rate, when the signal received from antenna 24 matches the rate of the antenna/capacitor circuit, the circuit resonates and generates a response signal. The RF frequency for which the circuit responds may be broadly adjusted by changing the length of the antenna pattern and finely adjusted by changing the value of the capacitor 40.

Figure 12:
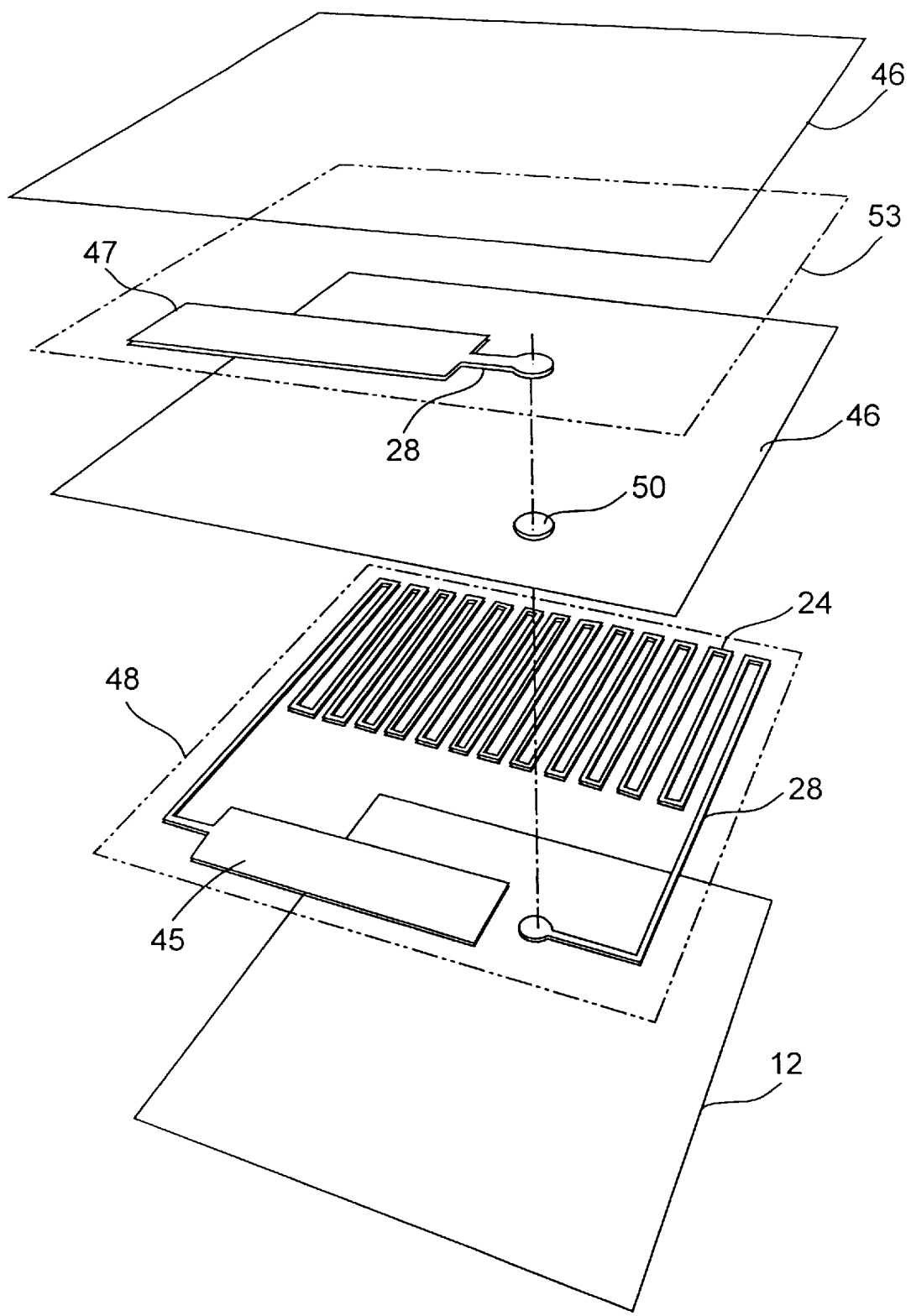
FIG. 12 is an exploded view of an information storage and identification tag constructed in accordance with the present invention.

FIG. 12 illustrates how a conductive ink printing process may be used to form a passive RF ID label with an embedded capacitor and antenna based upon the design of FIG. 11.

The first layer of conductive ink, indicated within phantom plane 48, includes antenna 24, a first plate 45 of the capacitor, and leads 28. This layer is printed on substrate 12. As indicated above, substrate 12 may be any suitable material. It may be a discrete label having an adhesive rear surface for attachment to an object, or it may be the surface of the object itself. If the substrate is a conductive material, it should be covered with a layer of non-conductive dielectric prior to applying layer 48.

The second print layer is a layer 46 of non-conductive dielectric ink. This layer is used to form a non-conductive barrier between the top and bottom conductive capacitor plates and to isolate conductive traces on first conductive layer 48 from subsequent conductive layers. A connection point 50 is provided in the layer 46 to permit electrical communication between the conductive layers where desired.

The second conductive layer, indicated in phantom at 53, includes the top conductive plate 47 for the capacitor as well as a lead 28 to complete the circuit. As a final step, a top dielectric layer 46 is disposed to cover all of the exposed conductive ink. This prevents inadvertent short circuits from contact with conductive surfaces and provides protection from water.

Figure 15:
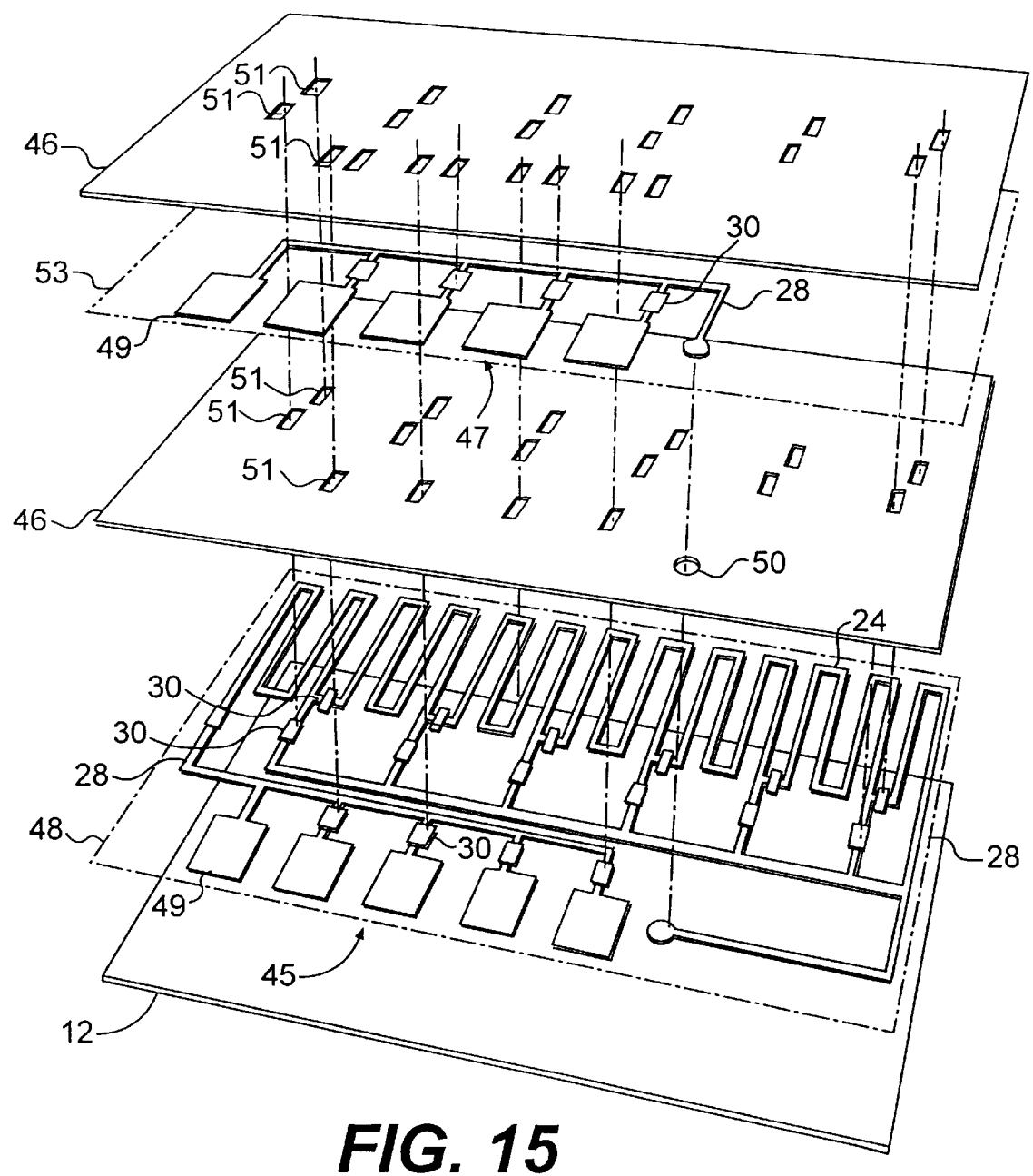
FIG. 15 is an exploded view of an information storage and identification tag constructed in accordance with the present invention.

FIG. 15 illustrates how selectable connections may be used with the circuit design of FIGS. 11 and 12 to form an RF ID tag having a selectable range of unique response signals. In this example, the single value capacitor illustrated in FIG. 12 is replaced with a multiple value capacitor having five panels 49 on each plate.

If a non-conductive dielectric material is used as substrate 12, conductive layer 48 may be disposed directly upon substrate 12. The first layer includes antenna 24, bottom conductive plate 45, and electrical leads, 28. Bottom plate 45 is divided into five panels 49 connected by a series of traces 28. Each of the traces that connects the panels 49 contains one or more opens 30. By selectively filling the opens with conductive material, two or more of the plates 49 may be electrically connected. This determines the surface area of plate 45 and adjusts the value of the resulting capacitor. In this example, capacitor plate 45 could provide five different capacitor values. Changing the capacitor value changes the frequency of the resonant circuit and, therefore, changes the response signal returned by the RF ID label when it is interrogated by a reader such as reader 32 (FIG. 2).

The antenna pattern 24 also contains a series of opens 30 in the length of antenna 24. By selectively filling these opens with conductive material, the effective length of the antenna may be increased or decreased, changing the resonant frequency and amplitude at which the RF ID tag will respond.

The next print layer is non-conductive dielectric label 46. Layer 46 contains a hole 50 to permit the interconnection of the circuit on layer 48 to the circuit on the subsequent conductive layer. It also contains three rows of holes 51 above the open circuits 30 of the antenna and capacitor traces.

The second conductive layer 53 includes the top capacitor plate 47 along with electrical traces 28 to complete the circuit through hole 50. The top plate 47 may also be divided into one or more panels 49 connected via traces 28 defining open circuits 30. By selectively filling the circuits 30 in the connecting traces 28, the effective surface area of the top plate of the capacitor may be increased or decreased, thereby adjusting the value of the capacitor. Three rows of holes 51 are provided to permit the selective filling of the opens 30 in the bottom conductive layer 48.

A final protective dielectric layer 46 is disposed to cover all of the conductive components. Holes may be left in the protective layer to provide test points where required. Additionally, three rows of holes 51 are left in this top layer 46 to permit the selective filling of the opens in both lower conductive layer 48 and upper conductive layer 53.

The open circuits in the antenna pattern and the capacitor may be completed at the time of issue or at the time of use by filling selected opens 30 with conductive ink or some other conductive material. In the example of FIG. 15, the open circuits in the antenna pattern permit selection from six antenna lengths. The open circuit pattern in the capacitor plates provide from five to eight different capacitor values. The combination of the multiple value capacitors and antenna values provide from thirty to forty eight different response signals for a single label.

The label illustrated in FIG. 15 may be manufactured using the same number of manufacturing steps as the label in FIG. 12. The multiple value design approach permits the manufacture of complex RF ID labels with the same number of manufacturing steps as very simple single value designs. The combination of multiple value design with conductive ink printing permits low cost manufacture of RF ID labels having complex response signal structures. The flexible printing process can produce RF ID labels on materials as thin as 0.002 inches or on very thick sheets of rigid material.

The same manufacturing method may be used to construct the design illustrated in FIG. 15 with a punch through response signal selection format. The principal difference is that all of the circuit paths for the antenna and the capacitor are completed during the manufacturing process. That is, there are no open circuits. The label is configured for a specific response signal by punching a hole in the circuit at a predetermined location to create open circuits in all but the desired paths.

The first conductive layer is printed as is layer 48 (FIG. 15), except that all circuit paths are completed in the printing process. Thus, opens 30 are now part of completed traces 28. The first dielectric layer 46 includes a hole only over the connection point between the conductive layers. The second conductive layer is identical to layer 53 in FIG. 15, except that the opens 30 are closed by completed traces. The top dielectric layer 46 covers all conductive ink. No holes are provided except, possibly, for testing purposes.

The top dielectric layer may be marked to indicate where the punch throughs should be made. Alternatively, a punch through machine may be programmed to make the punch throughs at the desired positions. The layout of the traces 28 permit the punch throughs at positions 30 such that the punch through may be made entirely through the tag without affecting other circuit components.

Figure 16:
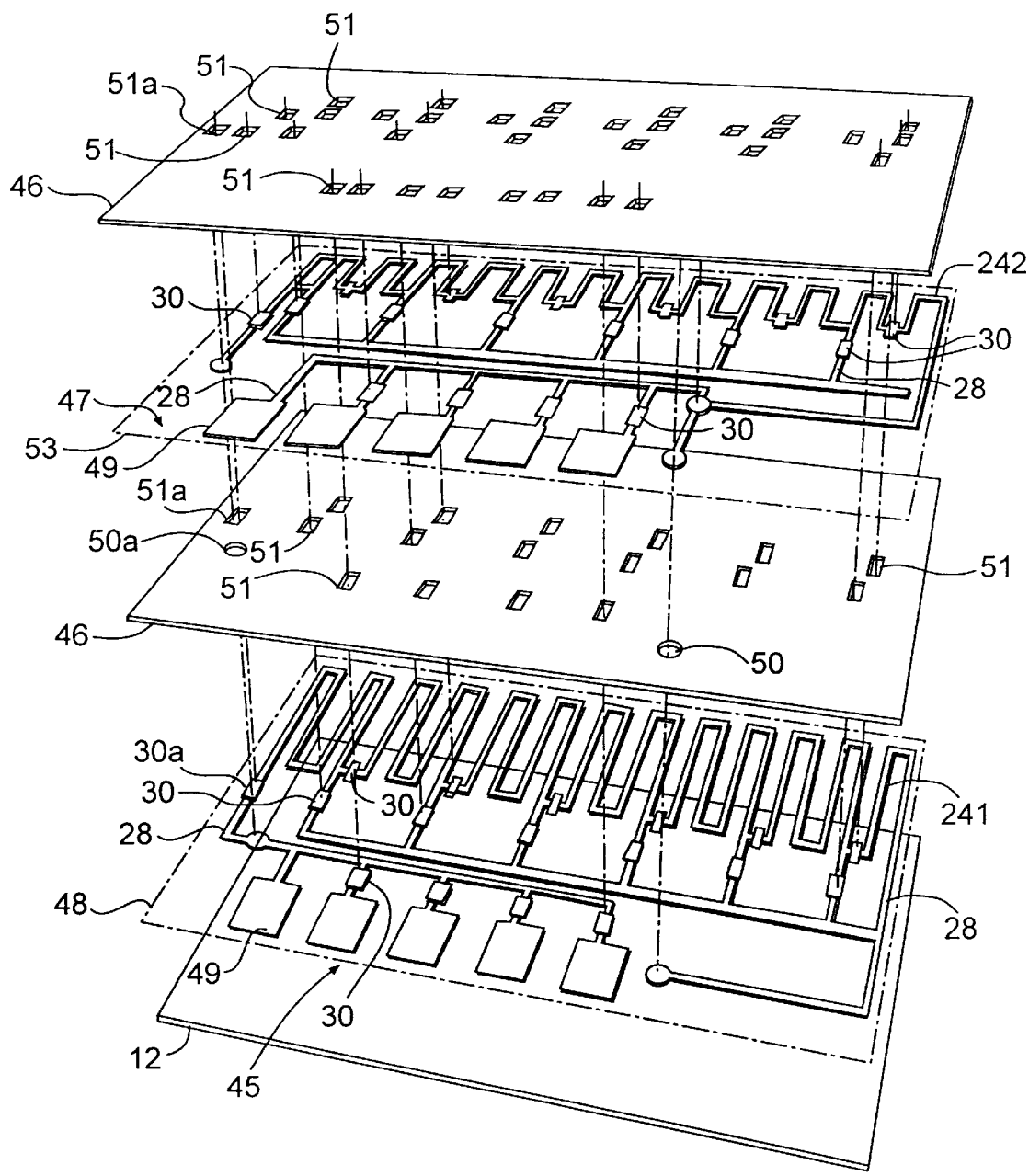
FIG. 16 is an exploded view of an information storage and identification tag constructed in accordance with the present invention.

Another exemplary circuit design is presented in FIG. 16. The tag utilizes the same basic design as in FIG. 15 with an additional antenna pattern 242. The tag is manufactured using the same number of print layers as in FIG. 15, but the number of possible response signals increases from approximately thirty to approximately one hundred forty eight.

The first conductive layer 48 is identical to the conductive layer 48 of FIG. 15 except that an additional connection point is added to permit connection of the second antenna pattern 242 to the bottom plate 45 of the capacitor, and an additional open circuit 30a is provided to permit the selection of antenna pattern 241 or 242. The lower dielectric layer 46 is identical to the lower dielectric layer 46 of FIG. 15 except that an additional hole 50a is provided over the connection point between the second antenna pattern 242 and the bottom plate 45 of the capacitor.

The top conductive layer 53 contains the additional antenna pattern 242. This permits the label to operate either on one of the frequencies of antenna 24a or antenna 24b, or a combination of one frequency from antenna 24a and one frequency from antenna 24b. This produces approximately twenty eight antenna combinations instead of the six possible with the label of FIG. 15. The top dielectric layer 46 is the final dielectric coating. More holes 51 are present in this layer than in the top layer 46 of FIG. 15 due to the increased number of opens.

In another preferred embodiment, the input/output mechanisms are contact points set in physical contact with electronic leads in the circuit. A variety of scanning devices may be used to contact the contact points and measure a variety of electronic characteristics in response to a given input. These characteristics may be very simple aspects of the circuits, for example resistance, capacitance or continuity, or they may be simple or complex electrical signals generated by an embedded circuit. The electrical signal generated by such circuits could be characterized by a range of factors, including frequency, amplitude, voltage or time domain response. Since any number of these factors could be used, it is possible to devise a variety of circuits that could be characterized by many combinations of electrical factors.

Figure 17:
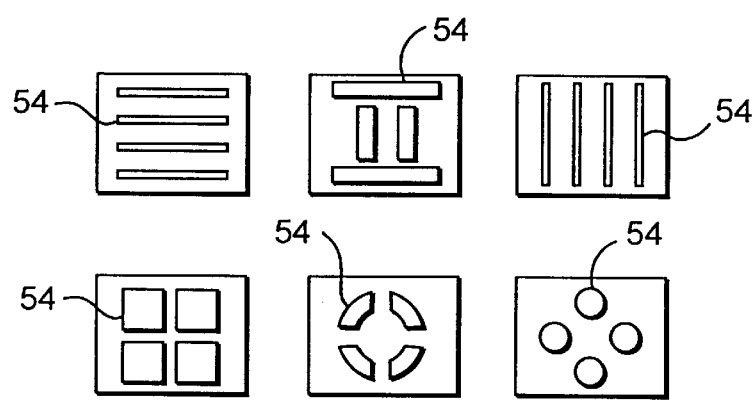
FIG. 17 is a diagrammatic view of exemplary contact point configurations for use with an information storage and identification tag constructed in accordance with the present invention.

The contact points may be arranged in a variety of shapes, for example bars, strips, circles, etc. in a variety of patterns so that they may be read by manual or high speed automated systems. Exemplary configurations of contact points 54 are illustrated in FIG. 17. These contact points are scanned by an electronic reader. The reader is an electronic measuring device designed to read a range of electrical characteristics. The complexity of the reader depends upon a specific application and the number of codes generated by the system. The reader may be programmed with a specific software algorithm controlling how the label is read and what factors and values are used to determine the response signal generated by the label. For example, assuming a circuit having multiple contact points 54 (FIG. 17), the algorithm should determine what combination of contact points are read, in what order those contact points are read, what factors (for example, resistance, continuity or frequency) are measured, at which contact points are particular factors read, and what range of values for these factors are used to characterized a specific response signal.

Since there are a great variety of possible ranges and value combinations, the reader is specifically programmed with an algorithm that allows it to read a series of labels. Thus, labels may be designed for a range of applications. Custom algorithms may be generated to provide a secure system for identifying and reading unique electronic signatures from custom labels. Those of ordinary skill in this art should understand that the number of possible algorithms is almost limitless. Accordingly, the discussion of exemplary embodiments below is not meant as a limitation of the present invention, and all suitable algorithms and label configurations are understood to be within the scope and spirit of the present invention.

Contact labels, like antenna labels, may be preprinted for a specific application, for example credit cards, checks, stocks, driver licenses, contracts, government documents and retail products. The labels may be coded at the time of issue with a specific response signal for association with specific items. For example, a bank or company issuing a large number of cashier's checks may have checks preprinted with a coded signature that uniquely identifies the company or bank that issued the check. Additionally, the label on each check may be coded at the time of issue with the identity of the location from which it was issued.

The following examples illustrate how the electrical characteristic of a printed circuit may be used to provide a electronic signature, or response signal. All of these examples illustrate the use of opens which may be selectively filled using the printing techniques generally described above. It should be understood, however, that the punch through method is also applicable to these examples.

Figure 18:
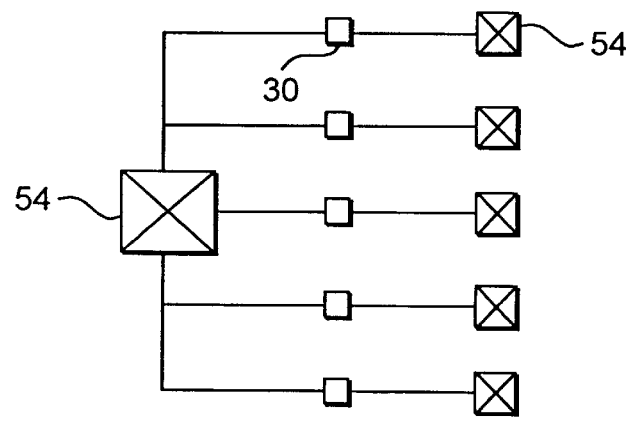
FIG. 18 is a schematic illustration of an exemplary circuitry layout for an information storage and identification tag constructed in accordance with the present invention.

FIG. 18 illustrates a simple electrical circuit using electrical continuity to determine a response signal for a printed circuit label. Each of five opens 30 is connected to a respective contact point 54, and all the opens are connected to a common contact point 54. The individual contact points are used to test the continuity of the circuit from the common contact point. By selectively filling the open circuits 30, applying an input signal (for example a voltage) at the common contact point, and measuring the output at the individual contact points, the continuity at the circuit between a common contact and the individual contacts may be determined. The construction as in FIG. 18 provides 28 possible combinations.

Figure 19:
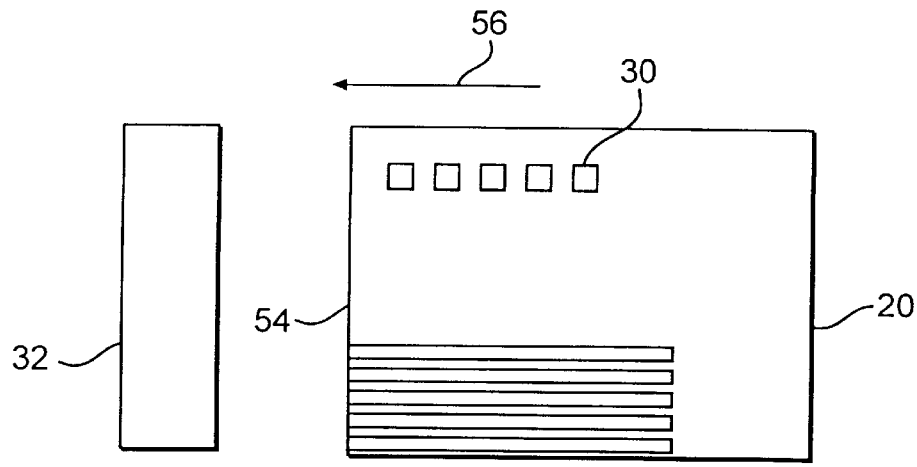
FIG. 19 is a plan view of an information storage and identification tag constructed in accordance with the present invention for use with a schematically represented reader.

The six contact points 54 may be laid out in any geometric fashion. As illustrated in FIG. 19, the contact points may be laid out in a series of bars, permitting a high speed reader 32 to read the cards or labels 20 as they are passed under the reader in a continuous fashion as indicated by the arrow 56.

Figure 20B:
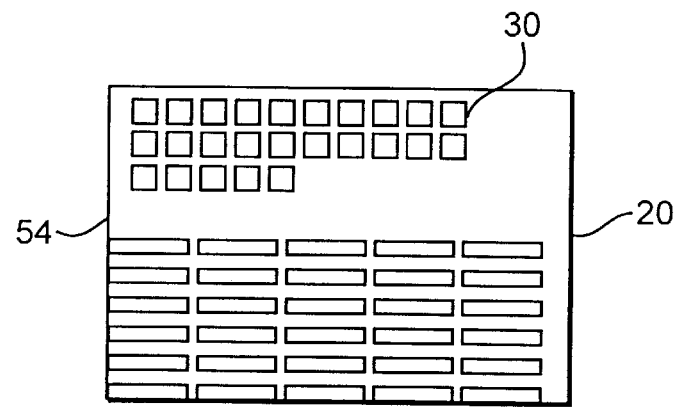
FIG. 20B is a plan view of an information storage and identification tag constructed in accordance with the present invention.
Figure 20A:
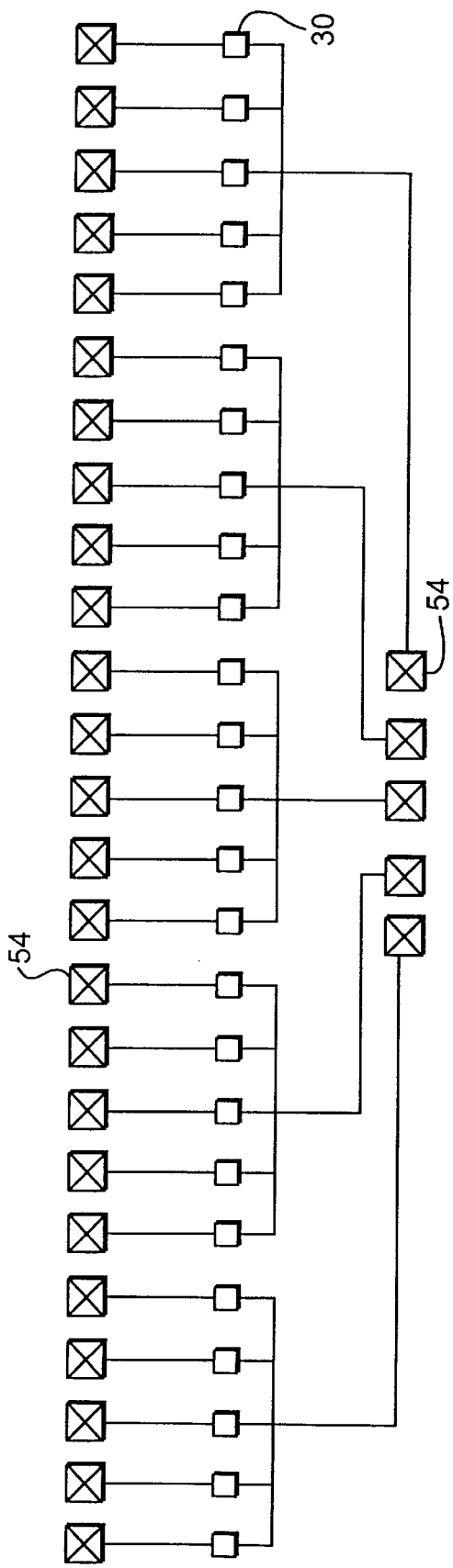
FIG. 20A is a schematic illustration of an exemplary circuitry layout for an information storage and identification tag constructed in accordance with the present invention.

The circuit configuration of FIG. 18 may be multiplied to increase the number of selectable response signals. For example, FIG. 20A illustrates the use of five such circuits, each having 28 possible combinations, to provide 17,210, 368 possible response signals. This circuit combination could be configured on a tag 20 as in FIG. 20B to be readable by a reader 32 (FIG. 19). The circuit may be printed on a label 20 approximately of the size of a retail price tag. Additionally, the label may be printed directly on a page to provide a unique electronic serial number for documents or individual pages. A more complex circuit may be employed to provide a secure serial number/response signal that could be read only by a reader configured to read that particular label series.

Figure 21B:
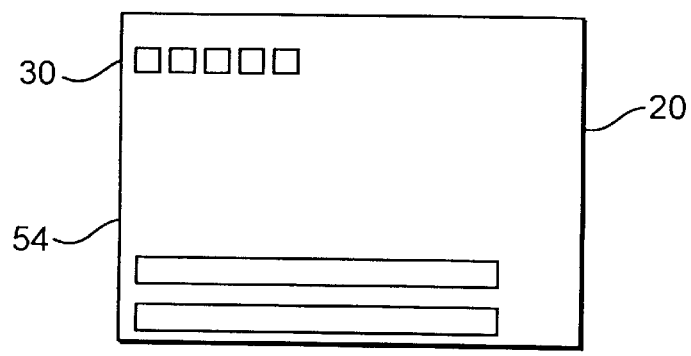
FIG. 21B is a plan view of an information storage and identification tag constructed in accordance with the present invention.
Figure 21A:
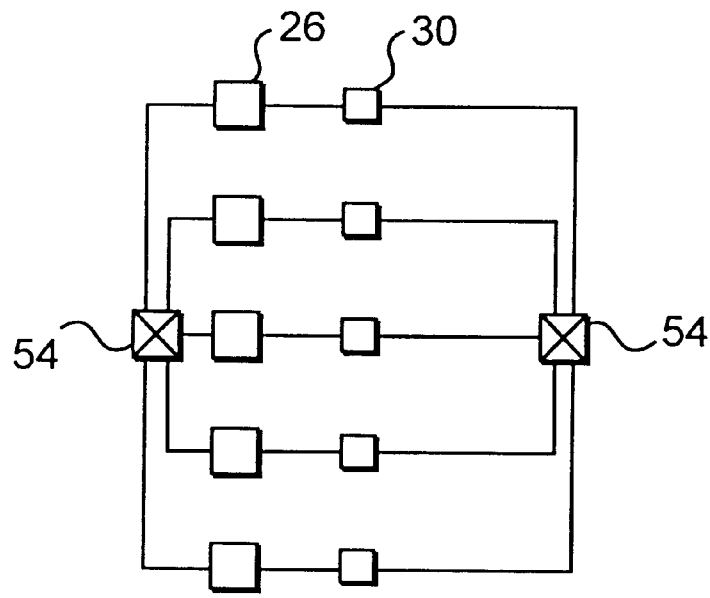
FIG. 21A is a schematic illustration of an exemplary circuitry layout for an information storage and identification tag constructed in accordance with the present invention.

FIG. 21A illustrates a circuit configuration configured to provide more complex responses. Code circuits 26 may be configured to output unique response codes, for example a unique signal pulse pattern. The code circuits may output the response code at a particular frequency or voltage. The code circuits are directly attached to a common contact point 54 and are selectively attached to a second common contact point 54 by open circuits 30. By selectively filling the opens and measuring the response from one contact point to the other, the circuit's particular response signal may be read, provided the reader algorithm knows what to look for. This two contact point example provides 28 response signal combinations.

FIG. 21B illustrates a tag 20 having contact points 54 and opens 30 arranged in an exemplary fashion so that the circuitry combination as in FIG. 21A is used with a reader 32 (FIG. 19).

Figure 22A:
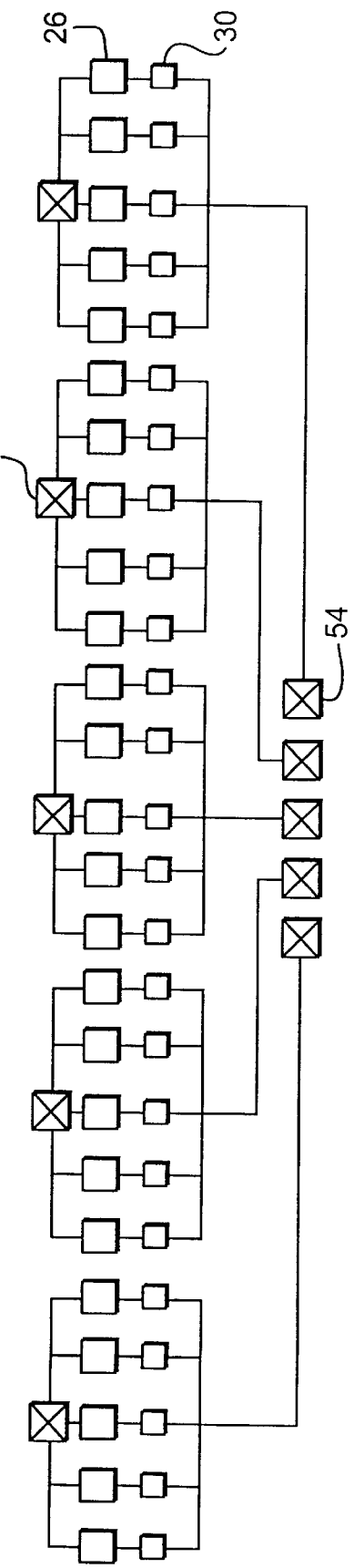
FIG. 22A is a schematic illustration of an exemplary circuitry layout for an information storage and identification tag constructed in accordance with the present invention.
Figure 22B:
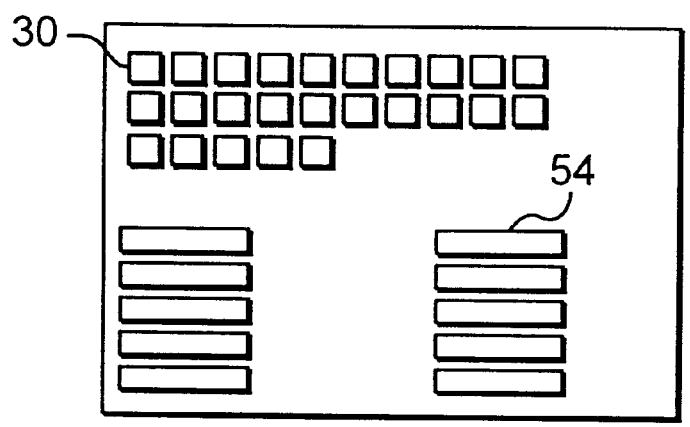
FIG. 22B is a plan view of an information storage and identification tag constructed in accordance with the present invention.

The configuration of FIGS. 20A and 21A may be merged to form a more complex circuit configuration as illustrated in FIG. 22A. An exemplary label geography for such a circuit is illustrated in FIG. 22B.

While preferred embodiments of the invention have been described above, it is to be understood that any and all equivalent realizations of the present invention are included within the scope and spirit thereof. For example, although the use of conductive, resistive, and dielectric inks is discussed, it should be understood that any suitable additive manufacturing process that can apply successive layers of conductive, resistive, and dielectric material may be employed. Examples include vapor deposition and three-dimensional stereo lithography. Thus, the embodiments depicted are presented by way of example only and are not intended as limitations on the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A method for encoding an encodable identification tag, said method comprising the steps of:
  providing an encodable identification tag including
    a substrate, and
    electrical circuitry disposed on said substrate and configured to receive a query signal and to output a response signal selectable among a predetermined plurality of response signals in response to receipt of said query signal,
    wherein said electrical circuitry includes a plurality of electrical components and a plurality of conductive traces,
    wherein each said trace is formed by a conductive material deposited on said substrate, extends between a first said component and a respective second said component, and has selectable states including an electrically conducting state in which said trace is electrically continuous from said first component to said respective second component and an electrically nonconducting state in which a gap is defined in said trace between said component and said respective second component,
  wherein said tag defines a receptacle at each said gap to receive conductive material to electrically close said gap, and
  wherein said response signal is dependent upon said state of said traces; and
  thereafter depositing a conductive material into said gap of at least one of said traces where said trace is in said nonconducting state in said providing step, thereby changing said state of said trace.

2. The method as in claim 1, wherein said providing step includes providing a plurality of said first components.

3. The method as in claim 2, wherein each said second component is connected to a plurality of said first components.

4. The method as in claim 1, wherein said first component is part of a code circuit configured to output a response code in response to said query signal, said code circuit comprising a plurality of said electrical components and being connected to a plurality of said second components by said traces.

5. The method as in claim 4, wherein said response code includes a signal pulse.

6. The method as in claim 4, wherein said electrical circuitry includes a plurality of said code circuits.

7. The method as in claim 6, wherein each said code circuit configured to output a said response signal in association with a said second component at a frequency different from the frequency at which any other code circuit of said plurality of code circuits outputs a said response signal.

8. The method as in claim 1, wherein said electrical circuitry is configured so that a frequency component of said response signal is dependent upon said state of said traces.

9. The method as in claim 1, wherein at least one said second component comprises an antenna.

10. The method as in claim 1, including a plurality of said second components and wherein said second components include a plurality of contact points.

11. The method as in claim 1, wherein said electrical circuitry is passive, said electrical circuitry being configured to output said response signal using energy provided by said query signal.

12. The method as in claim 1, wherein said electrical circuitry is constructed from conductive material printed on said substrate.

* * * * *